United States Patent
Choe et al.

(10) Patent No.: US 12,006,428 B2
(45) Date of Patent: Jun. 11, 2024

(54) THERMOPLASTIC RESIN COMPOSITION

(71) Applicant: LG CHEM, LTD., Seoul (KR)

(72) Inventors: Jun Ho Choe, Daejeon (KR); Seung Cheol Ryoo, Daejeon (KR); Seong Lyong Kim, Daejeon (KR); Dae San Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 526 days.

(21) Appl. No.: 17/436,554

(22) PCT Filed: Oct. 6, 2020

(86) PCT No.: PCT/KR2020/013556
§ 371 (c)(1),
(2) Date: Sep. 3, 2021

(87) PCT Pub. No.: WO2021/080211
PCT Pub. Date: Apr. 29, 2021

(65) Prior Publication Data
US 2022/0177688 A1    Jun. 9, 2022

(30) Foreign Application Priority Data

Oct. 23, 2019   (KR) .................. 10-2019-0132330
Oct. 5, 2020    (KR) .................. 10-2020-0128134

(51) Int. Cl.
*C08L 25/12*    (2006.01)

(52) U.S. Cl.
CPC ........... *C08L 25/12* (2013.01); *C08L 2203/30* (2013.01); *C08L 2205/035* (2013.01); *C08L 2205/18* (2013.01); *C08L 2207/066* (2013.01)

(58) Field of Classification Search
CPC .... C08L 25/12; C08L 9/02; C08L 9/06; C08L 55/02; C08L 51/06; C08L 23/04; C08L 23/06
See application file for complete search history.

(56) References Cited

U.S. PATENT DOCUMENTS

| | | |
|---|---|---|
| 5,051,471 A | 9/1991 | Shirodkar |
| 5,397,836 A | 3/1995 | DeNicola, Jr. et al. |
| 5,473,015 A | 12/1995 | DeNicola, Jr. et al. |
| 9,701,823 B2 * | 7/2017 | Landry, Jr. .......... C08L 23/0815 |
| 2010/0004394 A1 | 1/2010 | Higaki et al. |
| 2013/0123414 A1 | 5/2013 | Landry, Jr. et al. |
| 2013/0217817 A1 * | 8/2013 | Mochizuki .............. C08L 69/00 524/502 |
| 2020/0239682 A1 | 7/2020 | Ryoo |
| 2021/0108069 A1 | 4/2021 | Niessner et al. |

FOREIGN PATENT DOCUMENTS

| | | |
|---|---|---|
| CN | 103613877 A | 3/2014 |
| CN | 104327362 A | 2/2015 |
| CN | 104479273 A | 4/2015 |
| JP | 2005-120351 A | 5/2005 |
| JP | 2016-023258 A | 2/2016 |
| JP | 2019-172759 A | 10/2019 |
| KR | 10-0196968 B1 | 6/1999 |
| KR | 10-2018-0074280 A | 7/2018 |
| KR | 10-1933322 B1 | 12/2018 |
| KR | 10-2019-0060432 A | 6/2019 |
| WO | WO2019-158564 A1 | 8/2019 |

OTHER PUBLICATIONS

Extended European Search Report for related Application No. 20878780.4, mailed May 3, 2022.

* cited by examiner

*Primary Examiner* — Robert C Boyle

(57) ABSTRACT

The present invention provides a thermoplastic resin composition which comprises: a first polymer formed by graft polymerization of a diene-based rubber polymer with an aromatic vinyl-based monomer and a vinyl cyanide-based monomer; a second polymer comprising an aromatic vinyl-based monomer unit and a vinyl cyanide-based monomer unit; a third polymer formed by graft polymerization of an olefin-based polymer with an aromatic vinyl-based monomer and a vinyl cyanide-based monomer; and a fourth polymer comprising an olefin-based monomer unit and having a density of 0.92 to 0.94 $g/cm^3$ as measured in accordance with ASTM D1505, a softening point of 100 to 120° C. as measured in accordance with ASTM D1525, and a melt flow index of 5 to 7 g/10 min as measured in accordance with ASTM D1238 at 190° C. and 2.16 kg, wherein the thermoplastic resin composition comprises the fourth polymer at 1 to 10 wt %.

10 Claims, No Drawings

THERMOPLASTIC RESIN COMPOSITION

CROSS-REFERENCE TO RELATED APPLICATION

This application is a National Phase of International Application No. PCT/KR2020/013556 filed on Oct. 6, 2020, which claims priority to and the benefit of Korean Patent Application No. 10-2019-0132330, filed on Oct. 23, 2019, and Korean Patent Application No. 10-2020-0128134, filed on Oct. 5, 2020, the disclosures of which are incorporated herein by reference in their entirety.

TECHNICAL FIELD

Technical Field

The present invention relates to a thermoplastic resin composition, and specifically, to a thermoplastic resin composition which includes an appropriate amount of a fourth polymer including an olefin-based monomer unit and having specific levels of a density, a softening point, and a melt flow index.

Background Art

The field to which blow molding is applied does not require a painting process and has used olefin-based polymers such as low-density polyethylene (LDPE) and polypropylene. The olefin-based polymers may minimize a parison sagging phenomenon in blow molding.

Meanwhile, with the development of blow molding, blow molding has been applied in the field of automotive materials. However, the olefin-based polymers have a limitation in use as automotive exterior materials due to having poor paintability. Accordingly, as an alternative, there has been proposed a method of using a thermoplastic resin composition including a diene-based graft polymer having excellence in paintability, impact resistance, and heat resistance. However, a structural difference between the diene-based graft polymer and the olefin-based polymer causes a parison sagging phenomenon. In addition, automotive exterior materials need to be subjected to a sanding process which is a smoothing process for painting, and there is also an issue of improvement of sanding efficiency. In order to solve the problems, an α-methylstyrene/acrylonitrile polymer having a weight-average molecular weight of 150,000 g/mol or more and a diene-based graft polymer having a high degree of grafting have been used, but there is a limitation in improving production stability and heat resistance.

DISCLOSURE

Technical Problem

The present invention is directed to providing a thermoplastic resin composition which allows a parison sagging phenomenon and sandability to be improved and also allows degradation of heat resistance and tensile strength to be minimized.

Technical Solution

One aspect of the present invention provides a thermoplastic resin composition which comprises: a first polymer formed by graft polymerization of a diene-based rubber polymer with an aromatic vinyl-based monomer and a vinyl cyanide-based monomer; a second polymer comprising an aromatic vinyl-based monomer unit and a vinyl cyanide-based monomer unit; a third polymer formed by graft polymerization of an olefin-based polymer with an aromatic vinyl-based monomer and a vinyl cyanide-based monomer; and a fourth polymer comprising an olefin-based monomer unit and having a density of 0.92 to 0.94 g/cm$^3$ as measured in accordance with ASTM D1505, a softening point of 100 to 120° C. as measured in accordance with ASTM D1525, and a melt flow index of 5 to 7 g/10 min as measured in accordance with ASTM D1238 at 190° C. and 2.16 kg, wherein the thermoplastic resin composition comprises the fourth polymer at 1 to 10 wt %.

Advantageous Effects

A thermoplastic resin composition of the present invention can minimize degradation of heat resistance and mechanical properties and improve a parison sagging phenomenon and sandability. Therefore, the thermoplastic resin composition can be more suitable for automotive exterior materials.

MODES OF THE INVENTION

Hereinafter, the present invention will be described in more detail to facilitate understanding of the present invention.

Terms and words used in this specification and the claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technological spirit of the present invention.

In the present invention, the average particle diameter of a diene-based rubber polymer may be measured by a dynamic light scattering method, specifically, by using a Nicomp 380 instrument commercially available from Particle Sizing Systems. In the present invention, the average particle diameter may refer to an arithmetic average particle diameter in the particle size distribution as measured by a dynamic light scattering method, specifically, an average particle diameter in a scattering intensity distribution.

In the present invention, a diene-based rubber polymer refers to a polymer formed by a bridging reaction of diene-based monomers alone or of a diene-based monomer and a comonomer copolymerizable therewith. The diene-based monomer may be one or more selected from the group consisting of 1,3-butadiene, isoprene, chloroprene, and piperylene, with 1,3-butadiene being preferred. The comonomer may be an aromatic vinyl-based monomer, a vinyl cyanide-based monomer, an olefin-based monomer, or the like. The diene-based rubber polymer may be a butadiene rubber polymer, a butadiene-styrene rubber polymer, a butadiene-acrylonitrile rubber polymer, or the like. As the diene-based rubber polymer, a butadiene rubber polymer excellent in both impact strength and chemical resistance is preferred.

In the present invention, an aromatic vinyl-based monomer may be one or more selected from the group consisting of styrene, α-methylstyrene, α-ethylstyrene, and p-methylstyrene, with styrene being preferred. A unit derived from the aromatic vinyl-based monomer may be an aromatic vinyl-based monomer unit.

In the present invention, a vinyl cyanide-based monomer may be one or more selected from the group consisting of acrylonitrile, methacrylonitrile, phenyl acrylonitrile, and α-chloroacrylonitrile, with acrylonitrile being preferred. A unit derived from the vinyl cyanide-based monomer may be a vinyl cyanide-based monomer unit.

In the present invention, a maleimide-based monomer may be one or more selected from the group consisting of maleimide, N-methyl maleimide, N-ethyl maleimide, N-propyl maleimide, N-isopropyl maleimide, N-butyl maleimide, N-isobutyl maleimide, N-t-butyl maleimide, N-lauryl maleimide, N-cyclohexyl maleimide, N-phenyl maleimide, N-(4-chlorophenyl) maleimide, 2-methyl-N-phenyl maleimide, N-(4-bromophenyl) maleimide, N-(4-nitrophenyl) maleimide, N-(4-hydroxyphenyl) maleimide, N-(4-methoxyphenyl) maleimide, N-(4-carboxyphenyl) maleimide, and N-benzyl maleimide, with N-phenyl maleimide being preferred. A unit derived from the maleimide-based monomer may be a maleimide-based monomer unit.

In the present invention, a maleic acid-based monomer may be one or more selected from the group consisting of maleic anhydride, maleic acid, maleic monoester, and maleic diester, with maleic anhydride being preferred. A unit derived from the maleic acid-based monomer may be a maleic acid-based monomer unit.

In the present invention, an olefin-based monomer may be one or more selected from the group consisting of ethylene, propylene, and butene. A unit derived from the olefin-based monomer may be an olefin-based monomer unit.

In the present invention, an olefin-based polymer may refer to a polymer formed by polymerization of olefin-based monomers alone or of an olefin-based monomer and a comonomer copolymerizable therewith.

1. Thermoplastic Resin Composition

A thermoplastic resin composition according to an embodiment of the present invention includes: 1) a first polymer formed by graft polymerization of a diene-based rubber polymer with an aromatic vinyl-based monomer and a vinyl cyanide-based monomer; 2) a second polymer including an aromatic vinyl-based monomer unit and a vinyl cyanide-based monomer unit; 3) a third polymer formed by graft polymerization of an olefin-based polymer with an aromatic vinyl-based monomer and a vinyl cyanide-based monomer; and 4) a fourth polymer including an olefin-based monomer unit and having a density of 0.92 to 0.94 g/cm³ as measured in accordance with ASTM D1505, a softening point of 100 to 120° C. as measured in accordance with ASTM D1525, and a melt flow index of 5 to 7 g/10 min as measured in accordance with ASTM D1238 at 190° C. and 2.16 kg, wherein thermoplastic resin composition includes the fourth polymer at 1 to 10 wt %.

The inventors of the present invention have found that when a third polymer and a fourth polymer are included together, and the fourth polymer is included in a specific amount, degradation of a heat deflection temperature and tensile strength may be minimized, and a parison sagging phenomenon and sandability may be improved, and thus completed the present invention on the basis of these facts.

Hereinafter, each component of the thermoplastic resin composition according to the embodiment of the present invention will be described in detail.

1) First Polymer

A first polymer is a graft polymer formed by graft polymerization of a diene-based rubber polymer with an aromatic vinyl-based monomer and a vinyl cyanide-based monomer. The first polymer may impart excellent impact resistance to the thermoplastic resin composition and work synergistically with a fourth polymer to improve the parison sagging phenomenon of the thermoplastic resin composition.

The diene-based rubber polymer of the first polymer may have an average particle diameter of 200 to 400 nm, and preferably, 250 to 350 nm. When the above-described range is satisfied, impact resistance at room temperature and low temperatures can be improved.

The first polymer may be a graft polymer formed by graft polymerization of a butadiene rubber polymer with styrene and acrylonitrile.

Meanwhile, the first polymer may be included at 25 to 40 wt %, and preferably, 27 to 37 wt % in the thermoplastic resin composition. When the above-described range is satisfied, impact resistance at room temperature and low temperatures can be improved, and degradation of tensile strength can be minimized.

2) Second Polymer

The second polymer may be selected from the group consisting of: a polymer including an alkyl-substituted styrene-based monomer unit and a vinyl cyanide-based monomer unit; a polymer including an alkyl-unsubstituted styrene-based monomer unit and a vinyl cyanide-based monomer unit; and a polymer including an alkyl-substituted styrene-based monomer unit, an alkyl-unsubstituted styrene-based monomer unit, and a vinyl cyanide-based monomer unit. When the thermoplastic resin composition is applied in a technical field in which heat resistance is important, the second polymer may be selected from the group consisting of: a polymer including an alkyl-substituted styrene-based monomer unit and a vinyl cyanide-based monomer unit; and a polymer including an alkyl-substituted styrene-based monomer unit, an alkyl-unsubstituted styrene-based unit, and a vinyl cyanide-based monomer unit.

The second polymer may be selected from the group consisting of an α-methylstyrene/acrylonitrile polymer, a styrene/acrylonitrile polymer, and an α-methylstyrene/styrene/acrylonitrile polymer.

Meanwhile, the second polymer may be included at 45 to 70 wt %, and preferably, 50 to 65 wt % in the thermoplastic resin composition. When the above-described range is satisfied, a balance among first to fourth polymers or among first to fifth polymers can be achieved.

3) Third Polymer

A third polymer is a graft polymer formed by graft polymerization of an olefin-based polymer with an aromatic vinyl-based monomer and a vinyl cyanide-based monomer.

The third polymer exhibits excellent compatibility with the first polymer and the second polymer by including an aromatic vinyl-based monomer and a vinyl cyanide-based monomer and also exhibits excellent compatibility with a fourth polymer by including an olefin-based polymer. Due to these features, compatibility among the first polymer, second polymer, and fourth polymer can be improved.

The third polymer may be a graft polymer formed by graft polymerization of polyethylene with styrene and acrylonitrile.

The third polymer may have a melt flow index of 0.5 to 0.15 g/10 min, and preferably, 0.7 to 0.11 g/10 min, as measured in accordance with ISO 1133 at 190° C. and 2.16 kg. When the above-described condition is satisfied, compatibility with the first polymer, second polymer, and fourth polymer can be improved, and a parison sagging phenomenon can be improved.

Meanwhile, the third polymer may be included at 1 to 10 wt %, and preferably, 3 to 7 wt % in the thermoplastic resin composition. When the above-described range is satisfied, compatibility among the first polymer, second polymer, and fourth polymer can be improved, and degradation of tensile strength of the thermoplastic resin composition can be minimized.

4) Fourth Polymer

A fourth polymer is a polymer including an olefin-based monomer unit and having a density of 0.92 to 0.94 g/cm³ as measured in accordance with ASTM D1505, a softening point of 100 to 120° C. as measured in accordance with ASTM D1525, and a melt flow index of 5 to 7 g/10 min as measured in accordance with ASTM D1238 at 190° C. and 2.16 kg. Specifically, the fourth polymer may be a non-grafted polymer.

The fourth polymer is so-called linear low-density polyethylene and may substantially improve the parison sagging phenomenon and sandability of the thermoplastic resin composition. When the fourth polymer satisfies the above-described density and melt flow index, but does not satisfy the above-described softening point, it is difficult to disperse the fourth polymer in the thermoplastic resin composition, and thus surface quality may be degraded. In addition, when the fourth polymer satisfies the above-described softening point and melt flow index, but does not satisfy the above-described density, a parison sagging phenomenon may not be improved at all or occur above a specific temperature, and the effect of improving sandability may also be insufficient. Additionally, when the fourth polymer satisfies the above-described density and softening point, but does not satisfy the above-described melt flow index, a parison sagging phenomenon may occur, and surface quality may be degraded.

Meanwhile, the fourth polymer may have a density of 0.92 to 0.94 g/cm³, and preferably, 0.925 to 0.935 g/cm³, as measured in accordance with ASTM D1505. When the density of the fourth polymer is below the above-described range, surface quality may be degraded, and when above the above-described range, a parison sagging phenomenon may occur.

The fourth polymer may have a softening point of 100 to 120° C., and preferably, 105 to 115° C., as measured in accordance with ASTM D1525. When the softening point of the fourth polymer is below the above-described range, surface quality may be degraded, and when above the above-described range, a parison sagging phenomenon may occur.

The fourth polymer may have a melt flow index of 5 to 7 g/10 min, and preferably, 5.5 to 6.5 g/10 min, in accordance with ASTM D1238 at 190° C. and 2.16 kg. When the melt flow index of the fourth polymer is below the above-described range, it is difficult to disperse the fourth polymer in the thermoplastic resin composition, and thus surface quality may be degraded, and parison sagging may occur. When the melt flow index of the fourth polymer is above the above-described range, a parison sagging phenomenon may occur.

The fourth polymer may be a polymer including at least two types of mutually different olefin-based monomer units, specifically, polyethylene or poly(ethylene-co-1-butene).

The fourth polymer may be included at 1 to 10 wt %, and preferably, 3 to 8 wt % in the thermoplastic resin composition. When the above-described range is satisfied, the parison sagging phenomenon and sandability of the thermoplastic resin composition can be substantially improved. When the content of the fourth polymer is below the above-described range, the effect of improving the parison sagging phenomenon and sandability of the thermoplastic resin composition may be insufficient. When the content of the fourth polymer is above the above-described range, heat resistance may be degraded because a relatively small amount of the second polymer is included, and tensile strength may be degraded because a proportion of the diene-based rubber polymer in the thermoplastic resin composition increases. Also, compatibility among the first polymer, second polymer, and fourth polymer is degraded, and thus the fourth polymer may migrate, leading to degradation of surface quality.

The thermoplastic resin composition may include the third polymer and the fourth polymer in a weight ratio of 25:75 to 90:10, preferably 35:65 to 60:40, and more preferably 40:60 to 57:43. When the above-described range is satisfied, the third polymer can substantially improve compatibility among the first polymer, second polymer, and fourth polymer, and thus the parison sagging phenomenon and sandability of the thermoplastic resin composition can be improved. When the third polymer is included below the above-described range, it may be difficult to substantially improve compatibility among the first polymer, second polymer, and fourth polymer. Also, when the third polymer is included below the above-described range, the fourth polymer may migrate outside the thermoplastic resin composition, and thus surface quality may be degraded. When the third polymer is included above the above-described range, a relatively small amount of the fourth polymer is included, and thus it may be difficult to achieve the parison sagging phenomenon and sandability improvement effect caused by the fourth polymer.

5) Fifth Polymer

A fifth polymer is a polymer including a maleimide-based monomer unit, an aromatic vinyl-based monomer unit, and a maleic acid-based monomer unit and may be a non-grafted copolymer.

When applied in a technical field in which heat resistance is important, the thermoplastic resin composition according to the embodiment of the present invention may further include the fifth polymer.

The fifth polymer may have a glass transition temperature of 180 to 210° C., and preferably, 190 to 200° C. and a melt flow index of 1 to 5 g/10 min, and preferably, 2 to 4 g/10 min as measured in accordance with ASTM D1238 at 265° C. and 10 kg so as to impart excellent heat resistance and processability to the thermoplastic resin composition.

In this case, the glass transition temperature may be measured using a differential scanning calorimeter (DSC).

The fifth polymer may be a N-phenyl maleimide/maleic anhydride/styrene polymer including an N-phenyl maleimide unit, a maleic anhydride unit, and a styrene unit.

Meanwhile, when the fifth polymer is further included in the thermoplastic resin composition according to the embodiment of the present invention, the thermoplastic resin composition may include: the first polymer at 25 to 45 wt %; the second polymer at 30 to 50 wt %; the third polymer at 1 to 10 wt %; the fourth polymer at 1 to 10 wt %; and the fifth polymer at 5 to 25 wt % and preferably includes: the first polymer at 27 to 37 wt %; the second polymer at 35 to 45 wt %; the third polymer at 3 to 7 wt %; the fourth polymer at 3 to 8 wt %; and the fifth polymer at 10 to 20 wt %. When the above-described range is satisfied, degradation of basic properties of the thermoplastic resin composition can be minimized, and the parison sagging phenomenon and sandability can be improved while improving heat resistance.

Hereinafter, the present invention will be described in detail with reference to embodiments so that those skilled in the art can easily carry out the present invention. However, the present invention may be embodied in several different forms, and therefore, is not limited to embodiments described herein.

EXAMPLES AND COMPARATIVE EXAMPLES

Information on components used in the examples and comparative examples below is as follows.

1-1) First polymer: DP280 commercially available from LG Chem Ltd (graft polymer formed by graft polymerization of a butadiene rubber polymer having an average particle diameter of 300 nm with styrene and acrylonitrile)

2-1) Second polymer: 99UH commercially available from LG Chem Ltd (α-methylstyrene/acrylonitrile/styrene polymer)

2-2) Second polymer: 97HC commercially available from LG Chem Ltd (styrene/acrylonitrile polymer)

3-1) Third polymer: MODIPER® A1401 commercially available from NOF Corporation (LDPE-graft-PSAN)

4-1) Fourth polymer: UR744 commercially available from Late Chemical Corporation (linear low-density polyethylene, density: 0.932 g/cm$^3$, softening point: 110° C., melt flow index: 6.0 g/10 min)

5-1) Fifth polymer: MS-NB commercially available from Denka Company Limited (N-phenyl maleimide/styrene/maleic anhydride polymer)

6-1) Sixth polymer: LC168 commercially available from LG Chem Ltd (poly(ethylene-co-1-butene), density: 0.862 g/cm$^3$, melting point: 32° C., melt flow index: 1.2 g/10 min)

7-1) Seventh polymer: BS500 commercially available from LG Chem Ltd (polyethylene, density: 0.92 g/cm$^3$, softening point: 95° C., melt flow index: 3.3 g/10 min)

8-1) Eighth polymer: XL1800 commercially available from LG Chem Ltd (polyethylene, density: 0.95 g/cm$^3$, softening point: 124° C., melt flow index: 2.0 g/10 min)

The above-described components were mixed as shown in Tables 1 and 2 and stirred to prepare thermoplastic resin compositions.

EXPERIMENTAL EXAMPLES 100 parts by weight of the thermoplastic resin composition was uniformly mixed with 0.4 parts by weight of an antioxidant, and 0.3 parts by weight of ethylenebisstearamide as a lubricant, then extruded, and injection-molded to prepare a specimen. Then, physical properties of the specimen were evaluated by methods described below, and results thereof are shown in Tables 1 and 2.

(1) Melt flow index (g/10 min): measured in accordance with ISO 1133 under 220° C. and 10 kg conditions.

(2) Heat deflection temperature (° C.): measured in accordance with ISO 175 under 1.8 MPa and unannealed conditions.

(3) Charpy impact strength: measured in accordance with ISO 179 under notched and 23° C. conditions.

(4) Tensile strength: measured in accordance with ISO 527 under 50 mm/min and 23° C. conditions.

(5) Parison sagging: determined by discharging a parison with a length of 500 mm and a weight of 500 g and measuring the time taken for the parison to sag.

Good: 60 seconds or more, Fair: 20 seconds or more and less than 60 seconds, Poor: less than 20 seconds (6) Surface quality: determined by counting fish eyes on the surface of the specimen with a size of 40 mm×80 mm.

Good: 1 or less, Fair: 2, Poor: 3 or more (7) Sandability: determined by counting the sandpaper used to complete sanding.

Good: 1, Fair: 2, Poor: 3 or more

TABLE 1

| Classification | Comparative Example 1 | Example 1 | Example 2 | Example 3 | Example 4 | Comparative Example 2 |
|---|---|---|---|---|---|---|
| 1-1) First polymer | 32 | 32 | 32 | 32 | 32 | 32 |
| 2-1) Second polymer | 63 | 62 | 59 | 56 | 53 | 52 |
| 3-1) Third polymer | 5 | 5 | 5 | 5 | 5 | 5 |
| 4-1) Fourth polymer | 0 | 1 | 4 | 7 | 10 | 11 |
| Melt flow index | 5.5 | 7.2 | 7 | 6.5 | 6 | 7 |
| Heat deflection temperature | 90 | 89 | 88 | 87 | 86 | 85 |
| Charpy impact strength | 28 | 33 | 32 | 31 | 30 | 28 |
| Tensile strength | 43 | 45 | 43 | 41 | 39 | 38 |
| Parison sagging | Poor | Fair | Good | Good | Good | Good |
| Surface quality | Good | Good | Good | Good | Good | Poor |
| Sandability | Fair | Good | Good | Good | Good | Good |

1-1) First polymer: DP280 commercially available from LG Chem Ltd(graft polymer formed by graft polymerization of a butadiene rubber polymer having an average particle diameter of 300 nm with styrene and acrylonitrile)

2-1) Second polymer: 99UH commercially available from LG Chem Ltd (α-methylstyrene/acrylonitrile/styrene polymer)

2-2) Second polymer: 97HC commercially available from LG Chem Ltd (styrene/acrylonitrile polymer)

3-1) Third polymer: MODIPER ® A1401 commercially available from NOF Corporation (LDPE-graft-PSAN)

4-1) Fourth polymer: UR744 commercially available from Lotte Chemical Corporation (linear low-density polyethylene, density: 0.932 g/cm$^3$, softening point: 110° C., melt flow index: 6.0 g/10 min)

TABLE 2

| Classification | Comparative Example 3 | Example 5 | Comparative Example 4 | Comparative Example 5 | Comparative Example 6 | Comparative Example 7 |
|---|---|---|---|---|---|---|
| 1-1) First polymer | 32 | 32 | 32 | 32 | 32 | 32 |
| 2-1) Second polymer | 47 | 40 | 0 | 56 | 56 | 56 |
| 2-2) Second polymer | 0 | 0 | 20 | 0 | 0 | 0 |
| 3-1) Third polymer | 5 | 5 | 0 | 5 | 5 | 5 |
| 4-1) Fourth polymer | 0 | 7 | 0 | 0 | 0 | 0 |
| 5-1) Fifth polymer | 16 | 16 | 48 | 0 | 0 | 0 |
| 6-1) Sixth polymer | 0 | 0 | 0 | 7 | 0 | 0 |
| 7-1) Seventh polymer | 0 | 0 | 0 | 0 | 7 | 0 |
| 8-1) Eighth polymer | 0 | 0 | 0 | 0 | 0 | 7 |
| Melt flow index | 4 | 3.5 | 5 | 5.5 | 5.3 | 4.8 |
| Heat deflection temperature | 95 | 92 | 98 | 87 | 82 | 90 |
| Charpy impact strength | 24 | 26 | 22 | 38 | 38 | 38 |

TABLE 2-continued

| Classification | Comparative Example 3 | Example 5 | Comparative Example 4 | Comparative Example 5 | Comparative Example 6 | Comparative Example 7 |
|---|---|---|---|---|---|---|
| Tensile strength | 45 | 42 | 46 | 38 | 36 | 35 |
| Parison sagging | Fair | Good | Poor | Fair | Fair | Poor |
| Surface quality | Good | Good | Good | Fair | Poor | Fair |
| Sandability | Good | Good | Fair | Good | Good | Good |

1-1) First polymer: DP280 commercially available from LG Chem Ltd (graft polymer formed by graft polymerization of a butadiene rubber polymer having an average particle diameter of 300 nm with styrene and acrylonitrile)
2-1) Second polymer: 99UH commercially available from LG Chem Ltd (α-methylstyrene/acrylonitrile/styrene polymer)
2-2) Second polymer: 97HC commercially available from LG Chem Ltd (styrene/acrylonitrile polymer)
3-1) Third polymer: MODIPER ® A1401 commercially available from NOF Corporation (LDPE-graft-PSAN)
4-1) Fourth polymer: UR744 commercially available from Lotte Chemical Corporation (linear low-density polyethylene, density: 0.932 g/cm$^3$, softening point: 110° C., melt flow index: 6.0 g/10 min)
5-1) Fifth polymer: MS-NB commercially available from Denka Company Limited (N-phenyl maleimide/styrene/maleic anhydride polymer)
6-1) Sixth polymer: LC168 commercially available from LG Chem Ltd (poly(ethylene-co-1-butene), density: 0.862 g/cm$^3$, melting point: 32° C., melt flow index: 1.2 g/10 mm)
7-1) Seventh polymer: BS500 commercially available from LG Chem Ltd (polyethylene, density: 0.92 g/cm$^3$, softening point: 95° C., melt flow index: 3.3 g/10 mm)
8-1) Eighth polymer: XL1800 commercially available from LG Chem Ltd (polyethylene, density: 0.95 g/cm$^3$, softening point: 124° C., melt flow index: 2.0 g/10 mm)

Referring to Tables 1 and 2, in the case of Comparative Example 1 which did not include a fourth polymer, it can be seen that Charpy impact strength was slightly degraded, a parison sagging phenomenon occurred in a short time, and, fair sandability was exhibited. On the other hand, in the case of Examples 1 to 4 which included 1 to 10 parts by weight of a fourth polymer, it can be seen that a parison sagging phenomenon occurred late, and sandability was improved, as compared to Comparative Example 1. Also, since the content of a second polymer decreased as the content of a fourth polymer increased, heat resistance was slightly degraded, and impact strength was slightly improved. In the case of Comparative Example 2 which included 11 parts by weight of a fourth polymer, it can be seen that a parison sagging phenomenon occurred late, and good sandability was exhibited. However, since a larger amount of a fourth polymer than a third polymer was included, compatibility of the fourth polymer was degraded, and thus surface quality was degraded. Also, a heat deflection temperature, impact strength, and tensile strength were lowered compared to Examples 1 to 4.

When Example 3 which included 7 parts by weight of a fourth polymer and no fifth polymer and Example 5 which included 7 parts by weight of a fourth polymer and a fifth polymer were compared, it can be seen that both examples exhibited an improved parison sagging phenomenon and improved sandability, but Example 5 which further included a fifth polymer exhibited a higher heat deflection temperature, resulting in excellent heat resistance. However, even when Example 3 and Example 5 include the same amount of a first polymer, it can be seen that Example 5 exhibited lowered impact strength due to the fifth polymer and a lower melt flow index due to including a small amount of a second polymer. Therefore, it can be seen that the thermoplastic resin composition of Example 5 is desirable in a technical field in which heat resistance is important, and the thermoplastic resin composition of Example 3 is desirable in a technical field in which impact strength and processability are important.

Meanwhile, when Example 5 and Comparative Example 3, all of which further included a fifth polymer, were compared, in the case of Example 5 which included a fourth polymer, it can be seen that a parison sagging phenomenon and impact strength were improved. However, it can be seen that Example 5 exhibited a lower melt flow index and a lower heat deflection temperature compared to Comparative Example 3.

In the case of Comparative Example 4 which did not include a third polymer and a fourth polymer, it can be seen that a parison sagging phenomenon, sandability, and impact strength were degraded compared to Examples.

When Example 3 and Comparative Examples 5, 6, and 7 were compared, in the case of Example 3, it can be seen that a melt flow index, tensile strength, a parison sagging phenomenon, and surface quality were improved compared to Comparative Example 5 which included a sixth polymer having lower density and a lower melt flow index instead of a fourth polymer. Also, in the case of Example 3, it can be seen that a heat deflection temperature, tensile strength, a parison sagging phenomenon, and surface quality were improved compared to Comparative Example 6 which included a seventh polymer having a lower softening point and a lower melt flow index instead of a fourth polymer. Also, in the case of Example 3, it can be seen that tensile strength, a parison sagging phenomenon, and surface quality were improved compared to Comparative Example 7 which included an eighth polymer having a higher softening point and a lower melt flow index instead of a fourth polymer.

The invention claimed is:

1. A thermoplastic resin composition comprising:
    a first polymer formed by graft polymerization of a diene-based rubber polymer with an aromatic vinyl-based monomer and a vinyl cyanide-based monomer;
    a second polymer comprising an aromatic vinyl-based monomer unit and a vinyl cyanide-based monomer unit;
    a third polymer formed by graft polymerization of an olefin-based polymer with an aromatic vinyl-based monomer and a vinyl cyanide-based monomer; and
    a fourth polymer comprising an olefin-based monomer unit and having a density of 0.92 to 0.94 g/cm$^3$ as measured in accordance with ASTM D1505, a softening point of 100 to 120° C. as measured in accordance with ASTM D1525, and a melt flow index of 5 to 7 g/10 min as measured in accordance with ASTM D1238 at 190° C. and 2.16 kg,
    wherein the thermoplastic resin composition comprises the fourth polymer at 1 to 10 wt %.

2. The thermoplastic resin composition of claim 1, wherein the thermoplastic resin composition comprises the fourth polymer at 3 to 8 wt %.

3. The thermoplastic resin composition of claim 1, wherein the thermoplastic resin composition comprises the third polymer and the fourth polymer in a weight ratio of 25:75 to 90:10.

4. The thermoplastic resin composition of claim 1, wherein the thermoplastic resin composition comprises:
    the first polymer at 25 to 40 wt %;
    the second polymer at 45 to 70 wt %; and
    the third polymer at 1 to 10 wt %.

5. The thermoplastic resin composition of claim 1, wherein the thermoplastic resin composition comprises:
    the first polymer at 27 to 37 wt %;
    the second polymer at 50 to 65 wt %; and
    the third polymer at 3 to 7 wt %.

6. The thermoplastic resin composition of claim 1, wherein the diene-based rubber polymer of the first polymer has an average particle diameter of 300 to 400 nm.

7. The thermoplastic resin composition of claim 1, wherein the second polymer is selected from the group consisting of a polymer comprising an alkyl-substituted styrene-based monomer unit and a vinyl cyanide-based monomer unit, a polymer comprising an alkyl-unsubstituted styrene-based monomer unit and a vinyl cyanide-based monomer unit, and a polymer comprising an alkyl-substituted styrene-based monomer unit, an alkyl-unsubstituted styrene-based unit, and a vinyl cyanide-based monomer unit.

8. The thermoplastic resin composition of claim 1, wherein the fourth polymer comprises at least two types of mutually different olefin-based monomer units.

9. The thermoplastic resin composition of claim 1, further comprising a fifth polymer comprising a maleimide-based monomer unit, an aromatic vinyl-based monomer unit, and a maleic acid-based monomer unit.

10. The thermoplastic resin composition of claim 9, wherein the thermoplastic resin composition comprises:
the first polymer at 25 to 45 wt %;
the second polymer at 30 to 50 wt %;
the third polymer at 1 to 10 wt %;
the fourth polymer at 1 to 10 wt %; and
the fifth polymer at 5 to 25 wt %.

* * * * *